United States Patent
Isobe

(10) Patent No.: US 10,841,522 B2
(45) Date of Patent: Nov. 17, 2020

(54) IMAGE CAPTURING APPARATUS, CONTROL METHOD THEREFOR, AND RECORDING MEDIUM

(71) Applicant: CANON KABUSHIKI KAISHA, Tokyo (JP)

(72) Inventor: Shingo Isobe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 16/154,108

(22) Filed: Oct. 8, 2018

(65) Prior Publication Data
US 2019/0116330 A1    Apr. 18, 2019

(30) Foreign Application Priority Data
Oct. 16, 2017    (JP) ................................. 2017-200575

(51) Int. Cl.
| | |
|---|---|
| *H04N 5/378* | (2011.01) |
| *H04N 5/345* | (2011.01) |
| *H04N 5/20* | (2006.01) |
| *H04N 5/243* | (2006.01) |
| *H04N 5/353* | (2011.01) |
| *H04N 5/235* | (2006.01) |
| *H04N 5/232* | (2006.01) |
| *H04N 5/57* | (2006.01) |
| *G06T 7/11* | (2017.01) |

(52) U.S. Cl.
CPC .............. *H04N 5/378* (2013.01); *G06T 7/11* (2017.01); *H04N 5/20* (2013.01); *H04N 5/2351* (2013.01); *H04N 5/23229* (2013.01); *H04N 5/243* (2013.01); *H04N 5/3454* (2013.01); *H04N 5/3535* (2013.01); *H04N 5/57* (2013.01)

(58) Field of Classification Search
CPC ........ H04N 5/378; H04N 5/3454; H04N 5/57; H04N 5/20; H04N 5/243; H04N 5/3535; G06T 7/11
See application file for complete search history.

(56) References Cited

U.S. PATENT DOCUMENTS

| | | | |
|---|---|---|---|
| 2014/0253752 A1* | 9/2014 | Kawano | ............. H04N 5/23274 348/222.1 |
| 2016/0028949 A1* | 1/2016 | Lee | ......................... H04N 5/06 348/218.1 |

FOREIGN PATENT DOCUMENTS

| | | |
|---|---|---|
| JP | 5106052 B2 | 12/2012 |
| JP | 2015-156600 A | 8/2015 |

\* cited by examiner

*Primary Examiner* — Ahmed A Berhan
(74) *Attorney, Agent, or Firm* — Canon U.S.A., Inc. IP Division

(57) ABSTRACT

An apparatus capable of reading a signal in a partial region from an image sensor is configured to input a setting value for a region of interest; control accumulation and readout processing for the image sensor based on the setting value; detect a contrast of the region of interest based on an image capturing signal; and emphasize the contrast of the region of interest based on a result of the detected contrast with respect to the image capturing signal.

16 Claims, 13 Drawing Sheets

IMAGE CAPTURING APPARATUS, CONTROL METHOD THEREFOR, AND RECORDING MEDIUM

BACKGROUND OF THE INVENTION

Field of the Invention

The aspect of the embodiments relates to an image capturing apparatus capable of reading a pixel signal in a partial area from an image sensor, a control method therefor, and a recording medium.

Description of the Related Art

In the manufacturing line of a factory, an image capturing apparatus for image input may be used instead of a visual inspection performed by an inspector. Such an image capturing apparatus is also called a machine vision camera and is used for inspecting various parts and products together with computers and digital input/output devices. In recent years, in order to improve the inspection accuracy, an image capturing apparatus including 10 million or more pixels has been used. Also in consumer digital cameras, the number of pixels has been increased to achieve a higher image quality.

Along with the growing need for increasing the number of pixels and enhancing the image quality, recently, rolling shutter type complementary metal-oxide semiconductor (CMOS) sensors have been often used as image capturing elements used in cameras. The rolling shutter method is a line exposure sequential reading method in which exposure is sequentially performed for each row of image capturing elements, and an exposure time unit for exposing light to the sensors is also set for each row.

In a case where a moving image is captured by such an image capturing apparatus and a pixel signal is read from all the pixels of the pixel array, the reading time becomes long if the number of pixels is large. As a result, in the case of moving image shooting, the number of captured images per second decreases. In addition, since the amount of data to output the captured image to the outside increases, the frame rate decreases. For example, in a machine vision camera, the total of reading times changes according to the number of pixels to be captured, and the frame rate changes according to the number of pixels sent to the outside of the image capturing apparatus.

The inspection system using the machine vision camera is also required to shorten the inspection time. Therefore, the number of pixels to be read is reduced by reading pixel signals from a part of the image capturing region of the camera, thereby increasing the frame rate. An increase in the frame rate leads to a reduction in the inspection time of the entire system.

In addition, image processing is performed so that a video image captured by the machine vision camera facilitates determination by the inspection in the inspection system. Some image processing performed in the conventional inspection system is executed by a machine vision camera. The execution of image processing in advance with the machine vision camera makes it possible to improve the overall throughput.

Incidentally, an application in which a plurality of regions for reading pixel signals is set is required to set appropriate image capturing conditions for each region.

Japanese Patent No. 5106052 discloses a configuration in which a signal from a pixel of a first pixel group and a signal from a pixel of a second pixel group are read in different frames and a gain is varied for each pixel group. Thus, the recognition range of a subject image can be widened by decreasing the gain in a high luminance region and increasing the gain in a low luminance region.

In addition, Japanese Patent Laid-Open No. 2015-156600 discloses a configuration for controlling a correction strength of an image signal by using a gradation decrease evaluation unit that evaluates a degree of gradation decrease in a predetermined region in an image signal, and a gradation loss evaluation unit that evaluates a degree of gradation loss in a predetermined region in the image signal. With this configuration, it is possible to generate an image signal which can achieve both a high image quality and improved visibility according to the scene.

However, since image capturing is performed for each region in the method in Japanese Patent No. 5106052, the processing time increases as the region increases. In addition, the gain is changed in the method, and thus it is difficult to optimize the contrast in a region where the contrast is low on the high luminance side.

In the method of Japanese Patent Laid-Open No. 2015-156600, the visibility of the entire image is improved. However, since the image processing is performed so that the entire image has an optimum dynamic range, in an inspection system in which a machine vision camera is used, the contrast of the region is not always appropriate.

SUMMARY OF THE INVENTION

An apparatus capable of reading a pixel signal in a partial region from an image sensor includes at least one processor or circuit configured to function as: an input unit configured to input a setting value for a region of interest; a control unit configured to control accumulation and readout processing for the image sensor based on the setting value; a detection unit configured to detect a contrast of the region of interest based on an image capturing signal obtained by a pixel signal read under control of the control unit; and a processing unit configured to perform contrast emphasis processing on the region of interest based on a result of the detected contrast with respect to the image capturing signal.

Further features of the disclosure will become apparent from the following description of exemplary embodiments (with reference to the attached drawings).

DESCRIPTION OF THE EMBODIMENTS

Exemplary embodiments of the disclosure will be described below with reference to the accompanying drawings.

First Exemplary Embodiment

Figure 1:
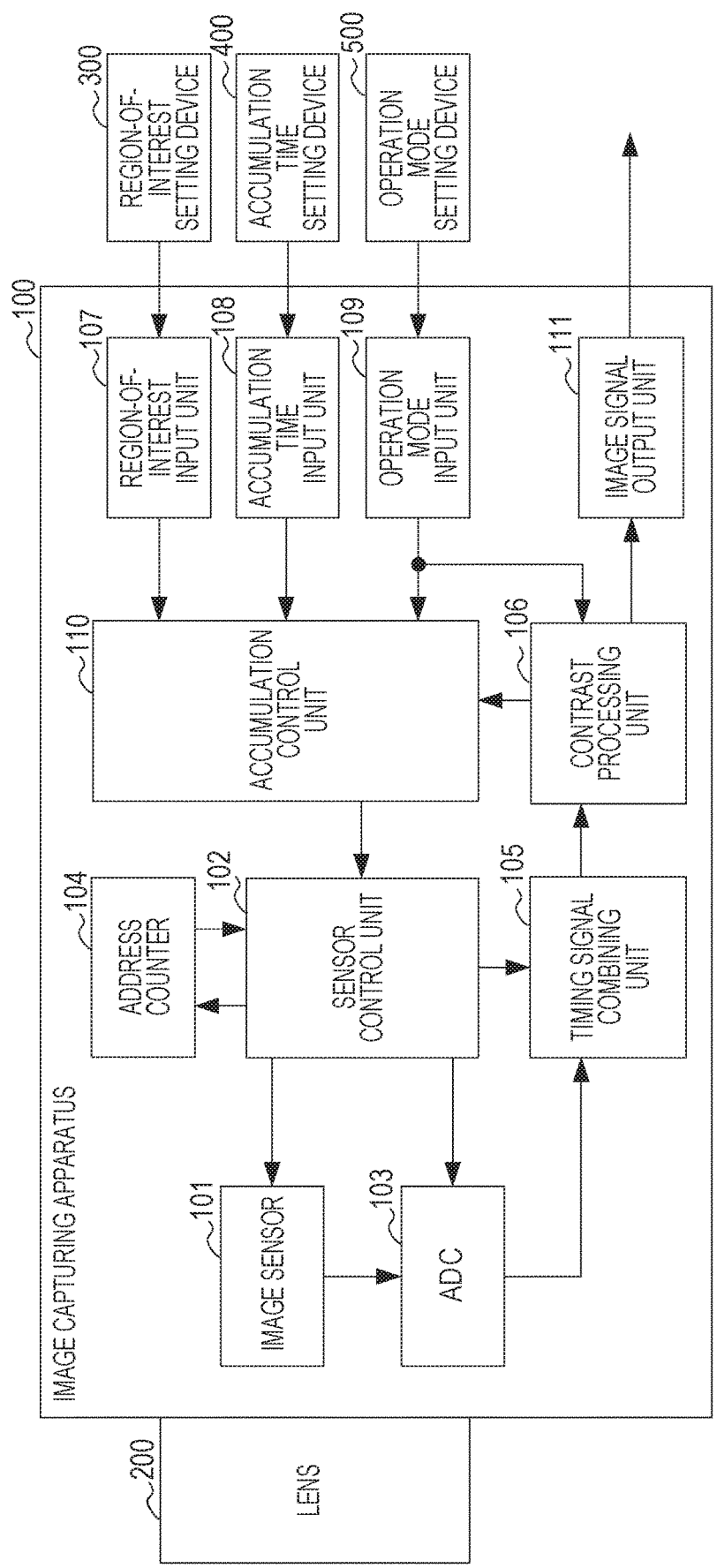
FIG. 1 is a diagram illustrating a configuration of an image capturing apparatus according to an exemplary embodiment.

FIG. 1 illustrates a configuration of an image capturing apparatus according to an exemplary embodiment.

An image capturing apparatus 100 includes an image sensor 101 that constitutes an image capturing system, a sensor control unit 102, an ADC 103, and an address counter 104. The image capturing apparatus 100 also includes a timing signal combining unit 105, a contrast processing unit 106, a region-of-interest input unit 107, an accumulation time input unit 108, an operation mode input unit 109, an accumulation control unit 110, and an image signal output unit 111.

A lens 200 is attached to the image capturing apparatus 100. The lens 200 includes elements such as a stop group, a magnification varying lens group, and a focus lens group, which are not illustrated. The magnification varying lens group included in the lens 200 may have a variable focal length or a fixed focal length. A light beam which has passed through the lens 200 forms an image on the image sensor 101.

The sensor control unit 102 generates a timing signal for the accumulation operation and the readout operation of the image sensor 101 and inputs the timing signal to the image sensor 101, thereby performing image capturing control including accumulation and readout processing for the image sensor 101. The image sensor 101 is a rolling shutter type complementary metal-oxide semiconductor (CMOS) sensor. When the image capturing control is performed by the sensor control unit 102, the image sensor 101 outputs an image capturing signal, and the ADC 103 performs AD conversion. The address counter 104 calculates an address to be a target row or target pixel for which the sensor control unit 102 performs accumulation processing and reading processing. In the case of reading pixel signals in a partial region from the image sensor 101, an address of a pixel to be read as a target pixel is set among all the pixels in the image capturing region of the image sensor 101, and readout processing on a region from which pixels are not read is omitted.

The timing signal combining unit 105 receives the image capturing signal data output from the ADC 103 and receives a signal from the address counter 104 via the sensor control unit 102 and combines a frame synchronous signal, a vertical synchronous signal, a horizontal synchronous signal, and the like with image capturing signal data.

A region-of-interest setting device 300 sets a region of interest. For example, the coordinates of a region of interest are set. The region-of-interest setting device 300 can set a plurality of regions of interest. For example, a personal computer (PC) is used as the region-of-interest setting device 300. The region-of-interest input unit 107 inputs and holds the setting value for the region of interest by the region-of-interest setting device 300.

An accumulation time setting device 400 sets an accumulation time. For example, a PC is used as the accumulation time setting device 400. The accumulation time input unit 108 inputs and holds a setting value for an accumulation time by the accumulation time setting device 400.

An operation mode setting device 500 sets an operation mode of the image capturing apparatus 100. For example, a PC is used as the operation mode setting device 500. The operation mode input unit 109 inputs and holds the setting value for the operation mode by the operation mode setting device 500. The processing executed by the contrast processing unit 106 and the accumulation control unit 110 is switched in accordance with the operation mode set by the operation mode setting device 500.

The region-of-interest setting device 300, the accumulation time setting device 400, and the operation mode setting device 500 may be configured by the same PC or may be configured by different PCs. Further, the region-of-interest setting device 300, the accumulation time setting device 400, and the operation mode setting device 500 may be configured by devices other than PCs. Alternatively, the image capturing apparatus 100 itself may have functions of the region-of-interest setting device 300, the accumulation time setting device 400, and the operation mode setting device 500.

The accumulation control unit 110 receives setting values held by the region-of-interest input unit 107, the accumulation time input unit 108, and the operation mode input unit 109. The setting value for the region of interest held by the region-of-interest input unit 107 is delivered to the address counter 104 via the sensor control unit 102 as region information to be read by the image sensor 101. As described above, under the control of the sensor control unit 102, a region which is not to be read, that is, a region other than the region of interest is skipped.

The contrast processing unit 106 performs contrast detection processing and contrast emphasis processing, which are described below, on the region of interest set by the region-of-interest setting device 300 in the image capturing signal data output from the timing signal combining unit 105.

The image signal output unit 111 outputs the image capturing signal data subjected to the contrast emphasis processing by the contrast processing unit 106 to the outside of the image capturing apparatus 100. In this case, in the image capturing signal data output from the contrast processing unit 106, output image signal data to which a timing signal is added is generated so that the coordinates of the region of interest set by the region-of-interest setting device 300 correspond to the coordinates of the region of interest of the image capturing signal data, and the generated output image signal data is output.

The various functions of the aspect of the embodiments are realized by, for example, causing at least one CPU to execute a predetermined program stored in a memory.

Figure 2:
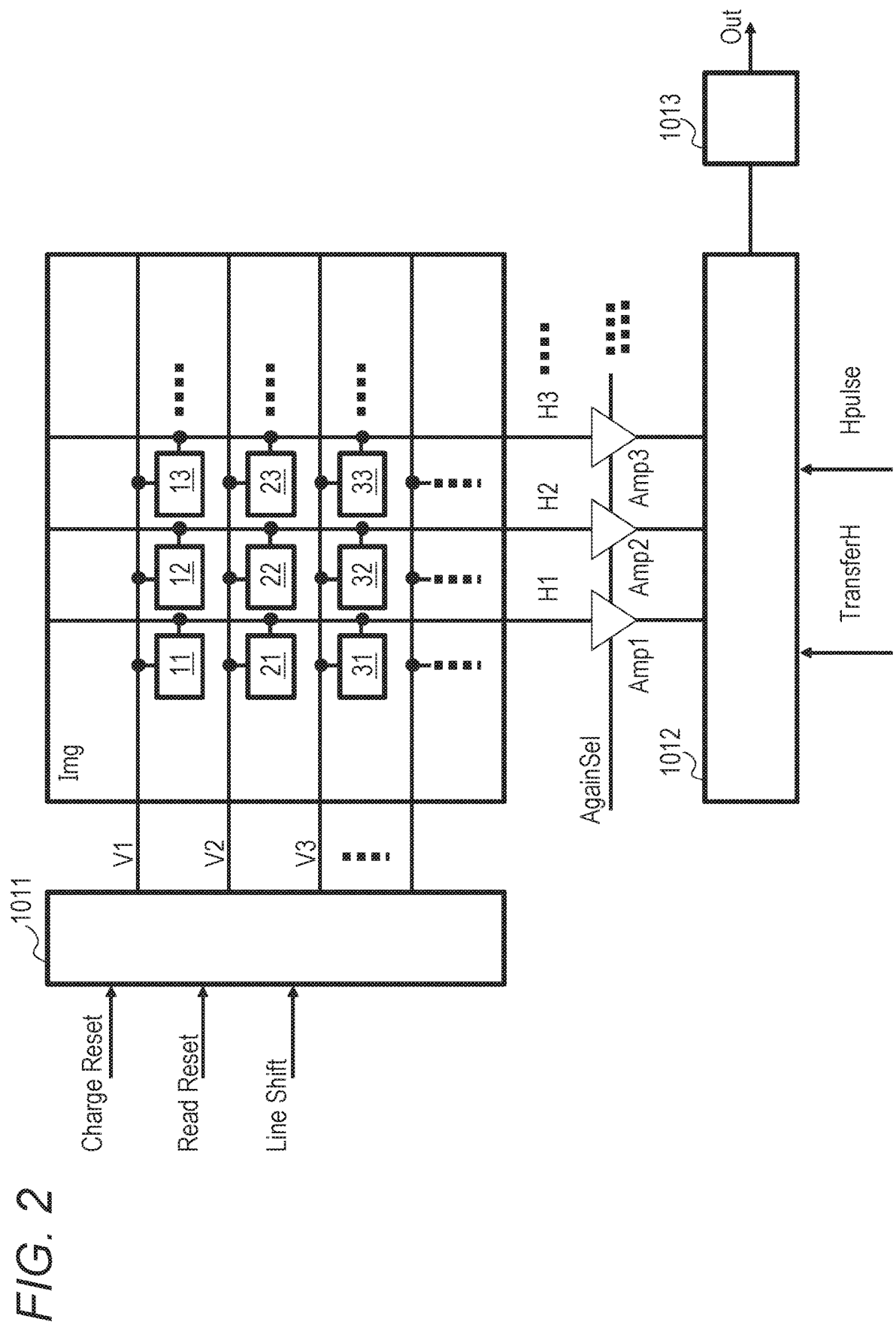
FIG. 2 is a structural diagram of an image sensor.

FIG. 2 illustrates a structural view of the image sensor 101. Reference sign Img denotes an image capturing element group arranged in a matrix, and represents some pixels 11 to 33 constituting the image capturing element group Img. A vertical scanning circuit 1011 is connected to each pixel in the image capturing element group Img via a horizontal signal line V (V1, V2, V3, . . . ). A horizontal scanning circuit 1012 is connected to each pixel in the image capturing element group Img via a vertical signal line H (H1, H2, H3, . . . ).

A plurality of column amplifier circuits Amp (Amp 1, Amp 2, Amp 3, and . . . ) provided so as to correspond to the pixel column is connected to each vertical signal line H to amplify the pixel signals read from each pixel. A column amplifier selection line Again Sel is connected to each column amplifier Amp, and the magnification of each column amplifier Amp can be selected in terms of a circuit. Examples of the selectable magnification include 1 time, 2 times, 4 times, 8 times, and 16 times. However, the magnification of each column amplifier circuit varies depending on the image sensor. Accordingly, the magnification may be arbitrarily set.

Three control lines of Charge Reset, Read Reset, and Line Shift are connected to the vertical scanning circuit 1011. These control lines are connected to the sensor control unit 102. In the vertical scanning circuit 1011, an accumulation target row selection register and a readout target row selection register are configured (see FIG. 4). Each row selection register can select a row to be accumulated and a row to be read in the image capturing element group Img. The control line Charge Reset resets the storage target row selected by the row selection register to a first row and starts accumulation in the first row. The control line Read Reset resets the row to be read selected by the row selection register to the first row. The control line Line Shift is a control line for incrementing the accumulation target row and the readout target row which are selected by the row selection register. When a Hi signal is input to the control line Line Shift (one shot pulse input), the row next to the target selected by each row selection register is referenced. The present exemplary embodiment illustrates an example where the number of Lines Shift is one. However, the Lines Shift may be separately configured so that the rows referred to by the accumulation target row selection register and the readout target row selection register can be individually incremented.

Two control lines of Transfer H and H pulse are connected to the horizontal scanning circuit 1012. These control lines are connected to the sensor control unit 102. After inputting a one-shot pulse to the control line Line Shift, the control line Transfer H transfers the pixel signal of the row to be read selected by the row selection register of the vertical scanning circuit 1011 to the horizontal scanning circuit 1012. For example, when the row to be read selected by the row selection register is V2, the pixel signals of pixels 21, 22, and 23 are transferred to the horizontal scanning circuit 1012 by the control line Transfer H. The control line H pulse is a control line for reading the pixel signal transferred to the horizontal scanning circuit 1012. When a pulse is input to the control line H pulse, the image capturing signal is analog output through the amplifier 1013. The image capturing signal is input to the ADC 103, and the ADC 103 performs AD conversion of the input image capturing signal in synchronization with the control line H pulse. The control line H pulse generates a number of clocks corresponding to the number of pixels to be read.

An example of image capturing control by the sensor control unit 102 will now be described with reference to FIGS. 3 and 4. Assuming that the number of rows to be read by the image sensor 101 is represented by n, a reading time for n rows is compared with an accumulation time per row, and the image capturing control method is switched based on the comparison result.

Figure 3:
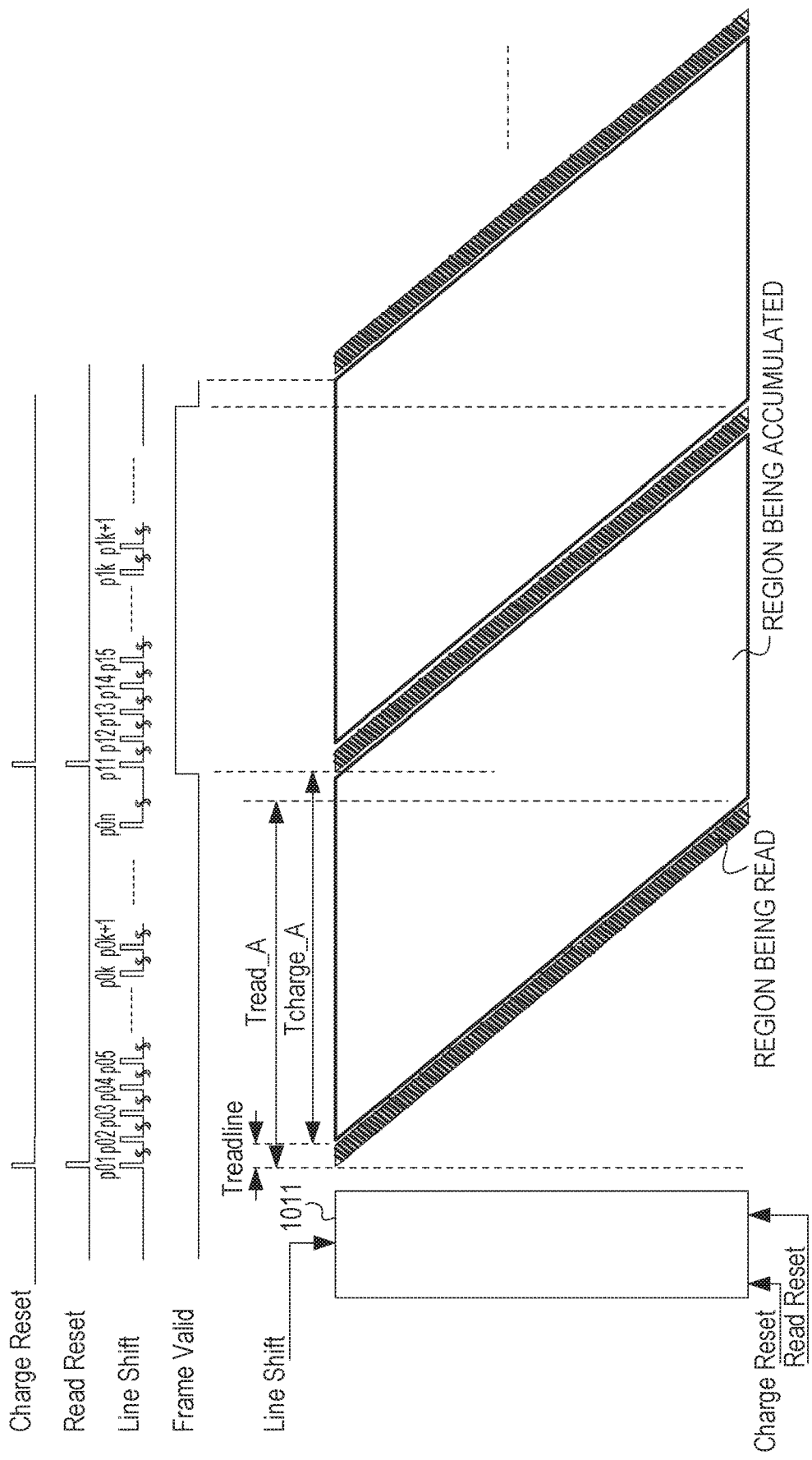
FIG. 3 is a view illustrating an example of image capturing control.

With reference to FIG. 3, an example of image capturing control under the condition that the accumulation time per row is equal to or longer than the reading time for n rows will be described. In FIG. 3, the horizontal axis represents the time direction. An upper part of FIG. 3 illustrates a timing chart, and a lower part of FIG. 3 illustrates the image of accumulation and readout processing in the row direction of the image sensor 101. First, by inputting a one-shot pulse to the control lines Read Reset and Line Shift at the timing p01, readout processing in a first line of the image sensor 101 is started. After inputting the pulse of the control line Line Shift at the timing p01, the pixel signals of the first row are read using the control signals Transfer H and H pulse of the horizontal scanning circuit 1012. When pixel signals are read, the ADC 103 performs AD conversion in synchronization with the control line H pulse. T readline illustrated in FIG. 3 represents a time required for reading pixel signals for one row.

After completion of reading of pixel signals of one row, a one-shot pulse is input to the control lines Line Shift and Charge Reset at the timing p02. The time T readline is equivalent to the interval time between p01 and p02. In addition, the time T readline is sufficiently longer than the Hi time of the one-shot pulse of the control line Line Shift which is input at p01, p02, etc. In this case, the row selection register of the vertical scanning circuit 1011 selects a second row as the row to be read, and selects the first row as the row to be accumulated. After the pixel signals of the first row are read from p01 to p02, the accumulation in the first row is started at p02. In the same manner as described above, from p02 to p03, the pixel signal of the second row is read at the time T readline. Accumulation processing and readout processing are performed with a time difference corresponding to the time T readline as indicated by "region being read" and "region being accumulated" in FIG. 3.

Similarly, when accumulation processing and readout processing up to the last row n of the image sensor 101 are performed during the period from p01 to p0n, readout processing from the first row is performed again at the timing p11. At the timing p11, processing similar to the processing to the horizontal scanning circuit 1012 performed at the timing p01 is performed. The pixel signals of the first row read at the timing p11 are accumulated from p02 to p11. For example, the pixel signals of the second row read at the timing p12 are accumulated from p03 to p12. The pixel signals read from p01 to p0n correspond to a 0th frame after the camera is activated, and the 0th frame is set as a dummy readout period. A Frame Valid signal illustrated in FIG. 3 is valid in each frame after p11 from which pixel signals accumulated in the 0th frame are read, that is, each frame after the first frame, and the pixel signals of the 0th frame read from p01 to p0n are invalid.

In this way, in the image capturing control of FIG. 3, the 0th frame is sequentially read from p01 to p0n, while the accumulation operation for outputting the first frame in each row is sequentially performed from the timing p02 and subsequent timings. As illustrated in FIG. 3, the reading time from the first row to the last row n is indicated as T read_A. The time obtained by multiplying time T readline by the number of rows n is T read_A. T charge_A indicates the accumulation time in the first row. In FIG. 3, the accumulation time T charge_A in each row from the first row to the last row n is equal to T charge_A0 and is uniform. Assuming that T read_A is T read and T charge_A is T charge, the relationship between T charge and T read is expressed by Expression (1).

$$T\ charge \geq T\ read \qquad (1)$$

Figure 4:
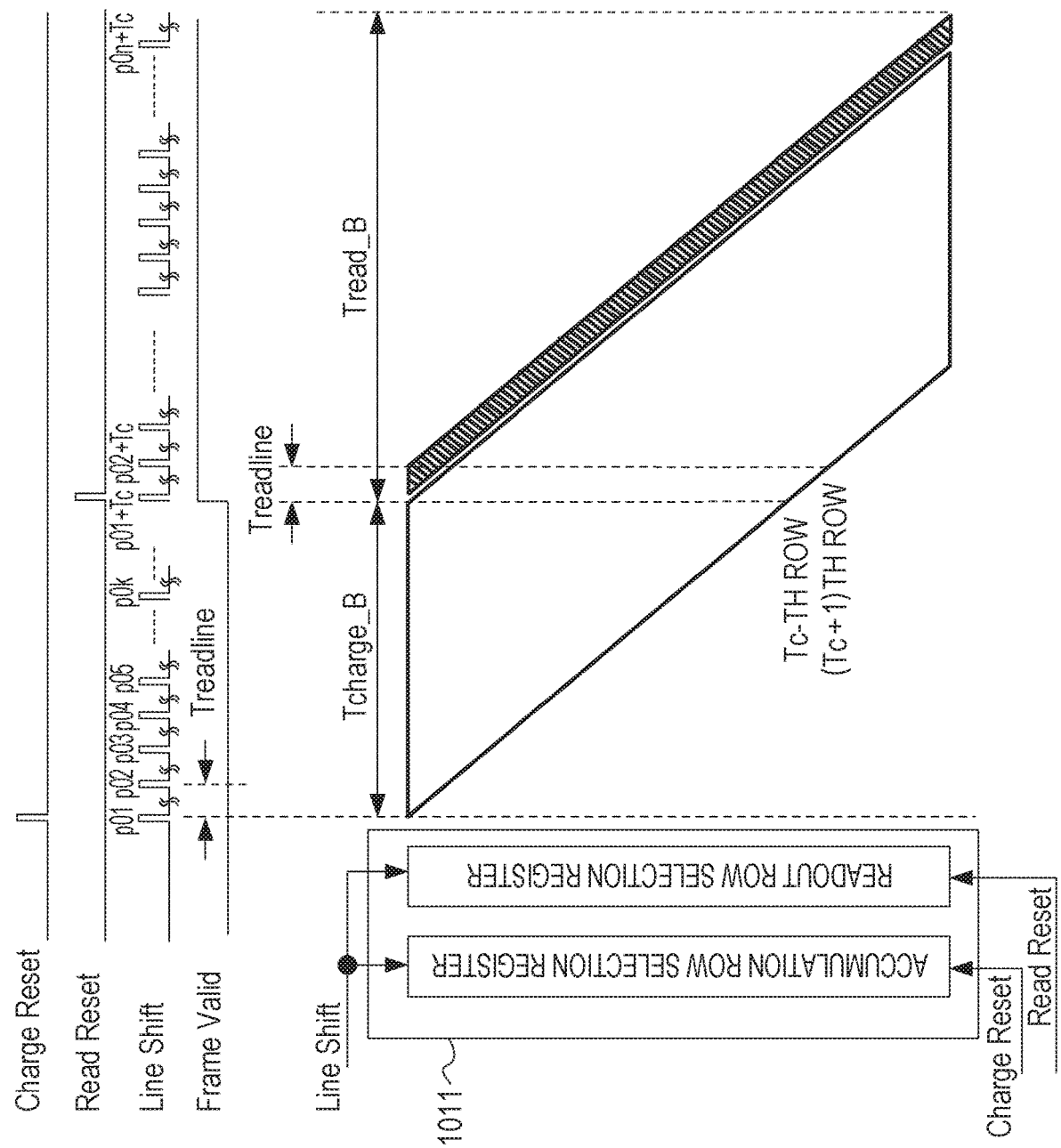
FIG. 4 is a diagram illustrating an example of image capturing control.

With reference to FIG. 4, an example of image capturing control under the condition that the accumulation time per row is less than the reading time for n rows will be described. In FIG. 4, the horizontal axis represents the time direction, an upper part of FIG. 4 illustrates a timing chart, and a lower part of FIG. 4 illustrates the image of accumulation and readout processing in the row direction of the image sensor 101. Unlike the relationship of Expression (1), in the case of the relationship of Expression (2), image capturing control as illustrated in FIG. 4 is performed.

$$T\ charge < T\ read \qquad (2)$$

First, by inputting a one-shot pulse to the control lines Charge Reset and Line Shift at the timing p01, the accumulation in the first line of the image sensor 101 is started. Next, by inputting a one-shot pulse to the control line Line Shift at the timing p02, the accumulation in the second line of the image sensor 101 is started. The interval time between p01 and p02 is equivalent to the time T readline as in the case of FIG. 3. Similarly, a one-shot pulse is input to the control line Line Shift at the time interval corresponding to the time T readline, that is, at the timings p01, p02, . . . , and p0k. By inputting the one-shot pulse to the control line Line Shift in this way, the accumulation is sequentially started in the first row, the second row, . . . , and the kth row of the image sensor 101 with a time lag of T readline. By inputting a one-shot pulse to the control lines Read Reset and Line Shift at the timing p01+Tc, the accumulation in the first row of the image sensor 101 is terminated.

After inputting the pulse of the control line Line Shift at the timing p01+Tc, the pixel signals of the first row are read using the control lines Transfer H and H pulse of the horizontal scanning circuit 1012 as in the case of FIG. 3. In this case, pixel signals accumulated during a period from p01 to p01+Tc, that is, an accumulation time T charge_B are read. In this case, Tc is a value obtained by dividing the accumulation time T charge_B per row by T readline. At the timing p01+Tc, the accumulation in the Tc-th row is started simultaneously with the reading of the first row. Thereafter, according to the same reading method as in the case of FIG. 3, reading is sequentially performed in each row up to the last row n with a time lag of T readline after the timing p01+Tc. A time required for reading all the rows of the image sensor 101 is given by T read_B. If the number of read lines is the same, T read_B is equal to T read_A illustrated in FIG. 3.

As described above, in the image capturing control illustrated in FIG. 4, the image capturing control is performed in a case where the accumulation time is shorter than the reading time, and after the time when the reading of the first row starts, the accumulation in the Tc-th row and subsequent rows is performed. In the case of continuously performing image capturing, accumulation processing and readout processing for the next frame are performed after the reading of all rows to be read is completed.

In view of the above example of image capturing control, the present exemplary embodiment illustrates an example where four regions of interest are set, readout and skipping are carried out, and contrast detection processing and contrast emphasis processing are performed on each region of interest.

Figure 5:
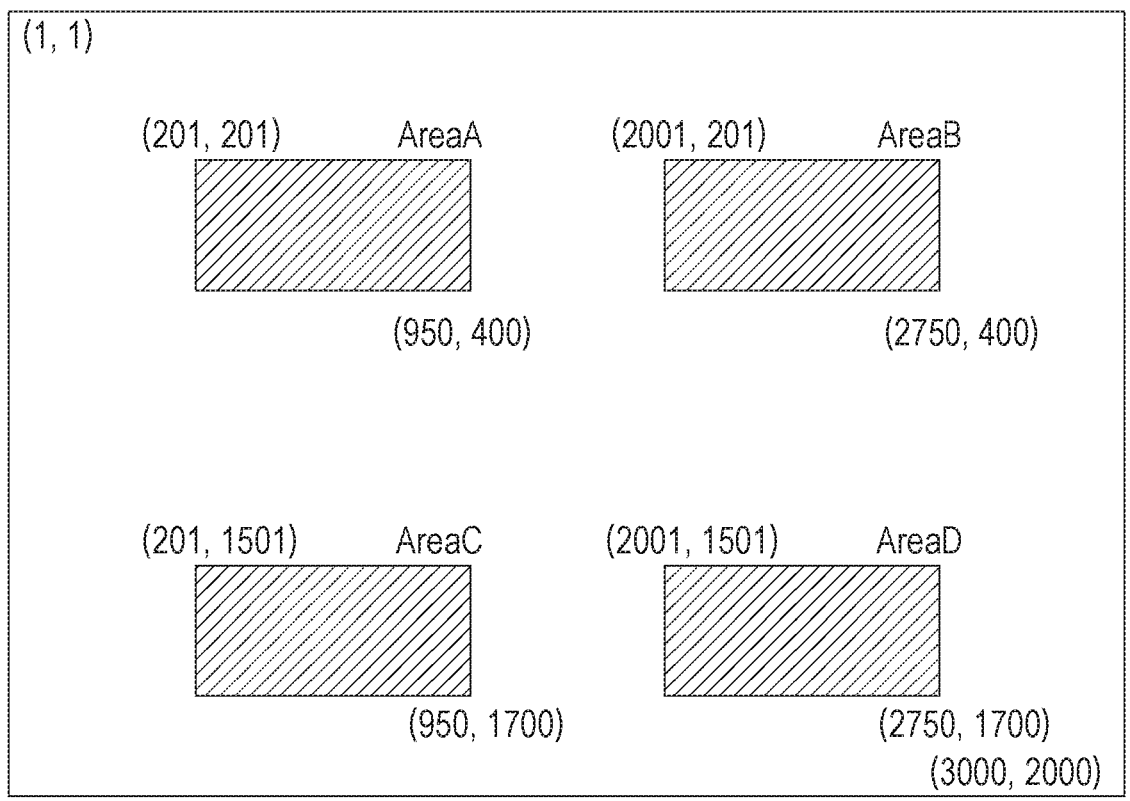
FIG. 5 is a diagram illustrating an example of an image sensor and a region of interest.

FIG. 5 illustrates an example of the image sensor 101 and the region of interest. In this example, the image sensor 101 includes 3000 rows and 2000 rows of image capturing elements. Each region of interest is indicated by oblique lines, and a region of interest A (Area A), a region of interest B (Area B), a region of interest C (Area C), and a region of interest D (Area D) are set. If a region is represented by upper left coordinates and lower right coordinates {X1, Y1, X2, Y2}, the region of interest A is represented by {201, 201, 950, 400}. Similarly, the region of interest B is represented by {2001, 201, 2750, 400}, the region of interest C is represented by {201, 1501, 950, 1700}, and the region of interest D is represented by {2001, 1501, 2750, 1700}.

Figure 6:
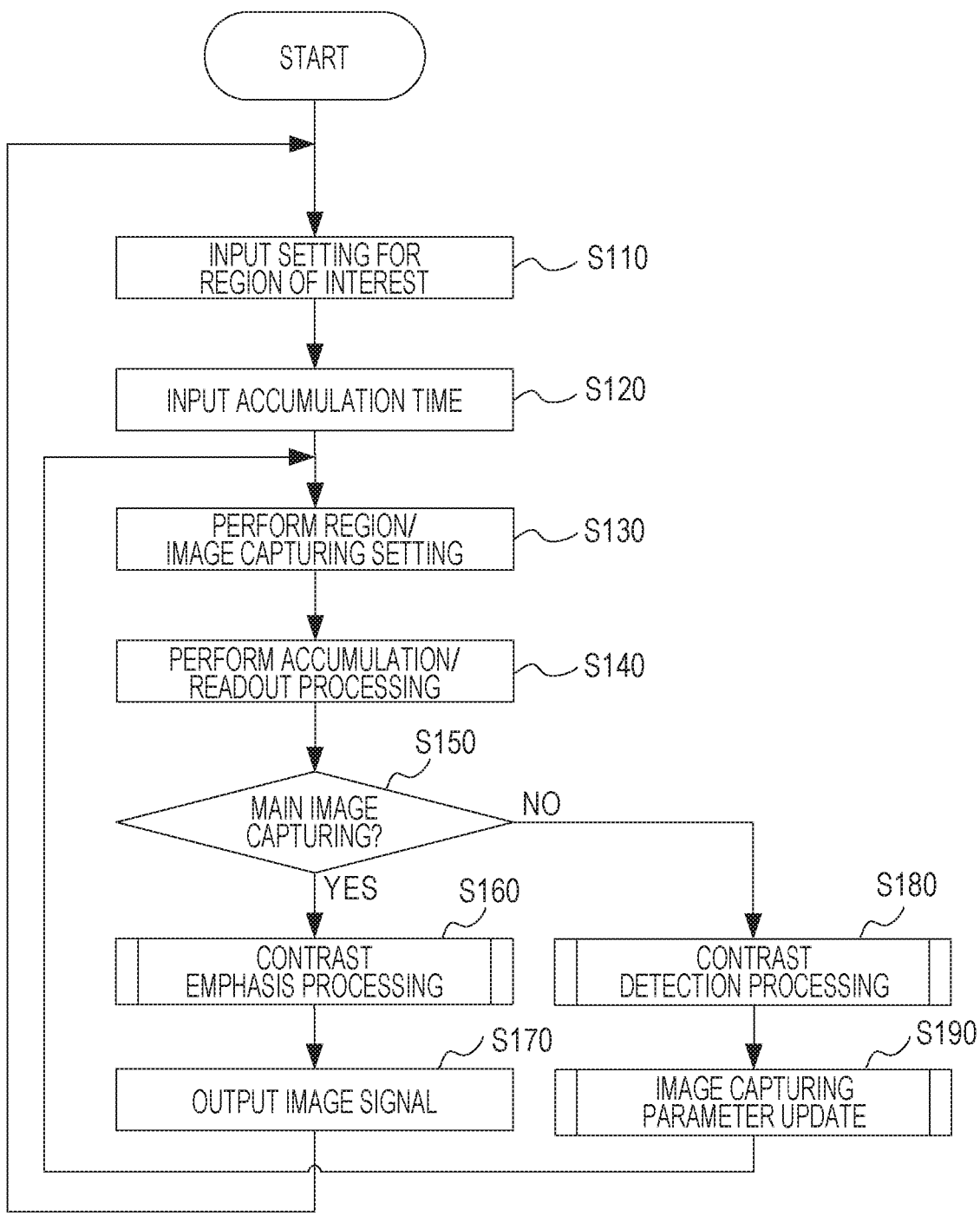
FIG. 6 is a flowchart illustrating processing performed by an image capturing apparatus according to a first exemplary embodiment.

FIG. 6 is a flowchart illustrating processing performed by the image capturing apparatus 100 in the first exemplary embodiment. When the image capturing apparatus 100 is powered on, the processing is executed in order from step S110.

In step S110, the setting value for the region of interest is input. The region-of-interest input unit 107 inputs the setting value for the region of interest (in this example, the coordinates of the region of interest A to the region of interest D) set by the region-of-interest setting device 300. A region excluding the regions of interest is identified as a skip region, that is, a region not to be read. The setting value for each region of interest is held in the region-of-interest input unit 107 and input to the accumulation control section 110. When step S110 is executed, then the processing proceeds to step S120.

In step S120, the setting value for the accumulation time is input as a so-called shutter speed. The accumulation time input unit 108 inputs the setting value for the accumulation time set by the accumulation time setting device 400. The setting value for the accumulation time is held in the accumulation time input unit 108 and input to the accumulation control unit 110. The accumulation time is generally indicated by $\frac{1}{60}$, $\frac{1}{120}$, etc., but instead may be indicated using any format. When step S120 is executed, the processing proceeds to step S130.

In step S130, the region of interest and image capturing setting are performed. The sensor control unit 102 and the address counter 104 convert the coordinates of the region of interest A to the region of interest D input in step S110 into the address of the image sensor 101 and also convert the coordinates into a readout target row and a skip row. In addition, the accumulation control unit 110 converts the coordinates into the count value of the control pulse for driving the image sensor 101 based on the accumulation time input in step S120, and sets the count value to the sensor control unit 102. Further, the sensor control unit 102 sets an amplifier gain of a column amplifier circuit Amp included in the image sensor 101. Although the initial value of the amplifier gain may be any value, the initial value is set to "1" in this example. Further, a main image capturing flag as a variable is inverted. The main image capturing flag is a flag variable used for determination in step S150 to be described below, and the main image capturing flag indicates true as a main image capturing state and false as a non-main image capturing state. Although details will be described below, it is assumed that the initial value is false (a state where main image capturing is not carried out). After completion of these setting processes, the processing proceeds to step S140.

In step S140, the sensor control unit 102 performs accumulation and readout processing for the image sensor 101 based on the region of interest and the image capturing setting made in step S130.

Figure 7:
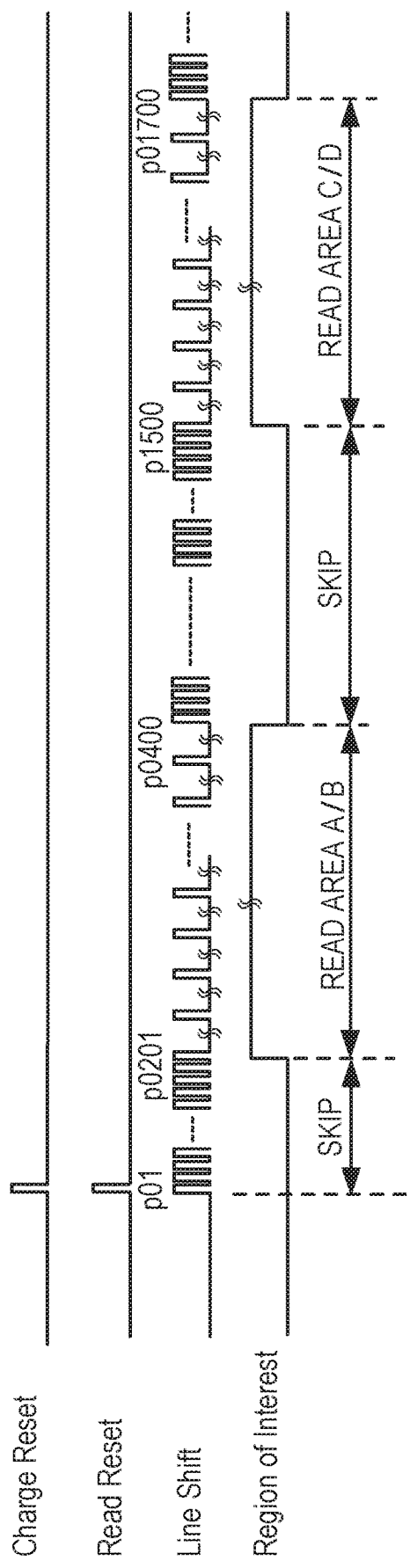
FIG. 7 is a timing chart of accumulation and readout processing.

FIG. 7 illustrates a timing chart of accumulation and readout processing executed in step S140. FIG. 7 illustrates an example of image capturing control under the condition illustrated in Expression (1). The time axis is taken on the horizontal axis and represents each pulse of control lines Charge Reset, Read Reset, and Line Shift. Under the condition illustrated in Expression (1), as described above, the row selection register is cleared by the Read Reset pulse, and the reading processing is performed from the first row of the image sensor 101.

In the period from p01 to p0201, pulses of the control line Line Shift are continuously issued to thereby skip reading from the first row to the 200th row. That is, reading is not carried out up to the 201st line of the start line of the region of interest A and the region of interest B.

Next, after the timing p0201, pulses of the control line Line Shift are issued at intervals of Tc, and reading up to p0400, that is, reading of the region of interest A and the region of interest B from the 201st row to the 400th row is performed.

Next, after the timing p0401, reading from the 401st row to the 1500th row is skipped by continuously issuing pulses of the control line Line Shift in the period of p1500, that is, the 1500th row.

Next, after the timing p1501, pulses of the control line Line Shift are issued again at intervals of Tc, and reading up to p1700, that is, reading of the region of interest C and the region of interest D from the 1501st row to the 1700th row is performed.

The timing at which reading of the region of interest A to the region of interest D is performed is indicated in a section where the region of interest is High.

The image capturing signals of the regions of interest A to D read in step S140 are subjected to AD conversion by the ADC 103 and then sent to the contrast processing unit 106 via the timing signal combining unit 105. Since the flow of data up to this point is performed by hardware, it is assumed that steps S150 to S190 to be described below are executed concurrently. After completion of the processing of step S140, the processing proceeds to step S150.

Referring again to FIG. 6, in step S150, the sensor control unit 102 determines the main image capturing flag. If the main image capturing flag indicates true, the processing proceeds to step S160, and if the main image capturing flag indicates false, the processing proceeds to step S180. Since the initial value is set to false as described above, the processing proceeds to step S180 in this case.

In step S180, the contrast processing unit 106 detects the contrasts of the region of interest A to the region of interest D based on the image capturing signal data of the region of interest A to the region of interest D that is read out in step S140 and has passed through the ADC 103 and the timing signal combining unit 105.

Figure 8:
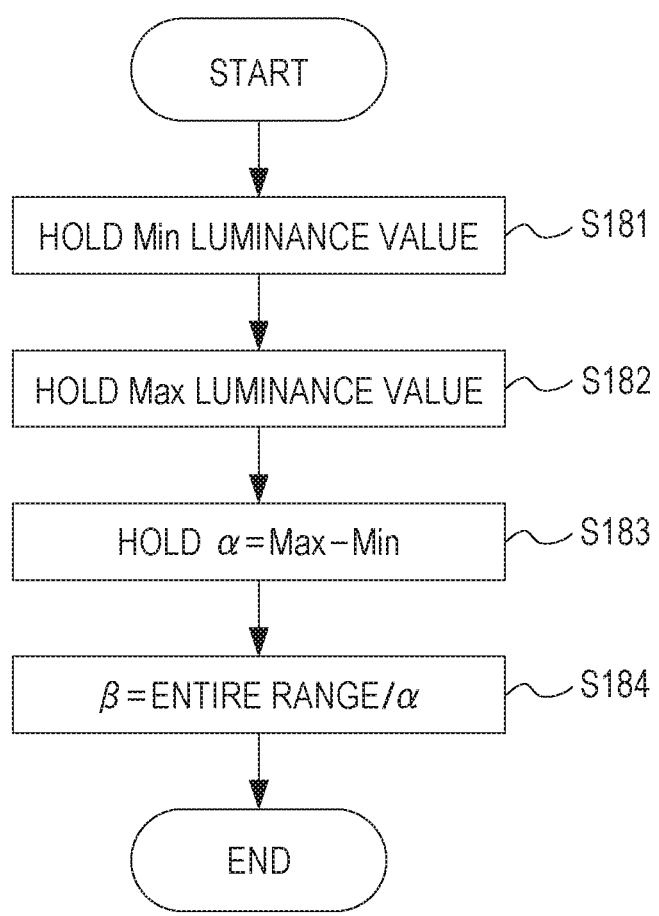
FIG. 8 is a flowchart illustrating a subroutine of contrast detection processing.

FIG. 8 is a flowchart illustrating a subroutine of contrast detection processing of step S180. The subroutine illustrated in FIG. 8 is processed for each region of interest.

In step S181, the minimum luminance value of the region of interest is obtained and held. In step S182, the maximum luminance value of the region of interest is obtained and held. In step S183, a luminance range α of the region of interest is obtained by subtracting the minimum luminance value of the region of interest held in step S181 from the maximum luminance value of the region of interest held in step S182. The luminance range α is held for each region of interest. In step S184, the result obtained by dividing the entire range that can be taken as a pixel signal by the luminance range α is stored as β (hereinafter referred to as an extended value). The extended value β is also held for each region of interest, like the luminance range α. The extended value β is a gain used for contrast emphasis processing executed in step S160 to be described below.

When step S184 is executed, the subroutine of FIG. 8 is terminated, and then the processing proceeds to step S190.

Referring again to FIG. 6, in step S190, the sensor control unit 102 updates the image capturing parameters based on the contrast detection result of step S180.

Figure 9:
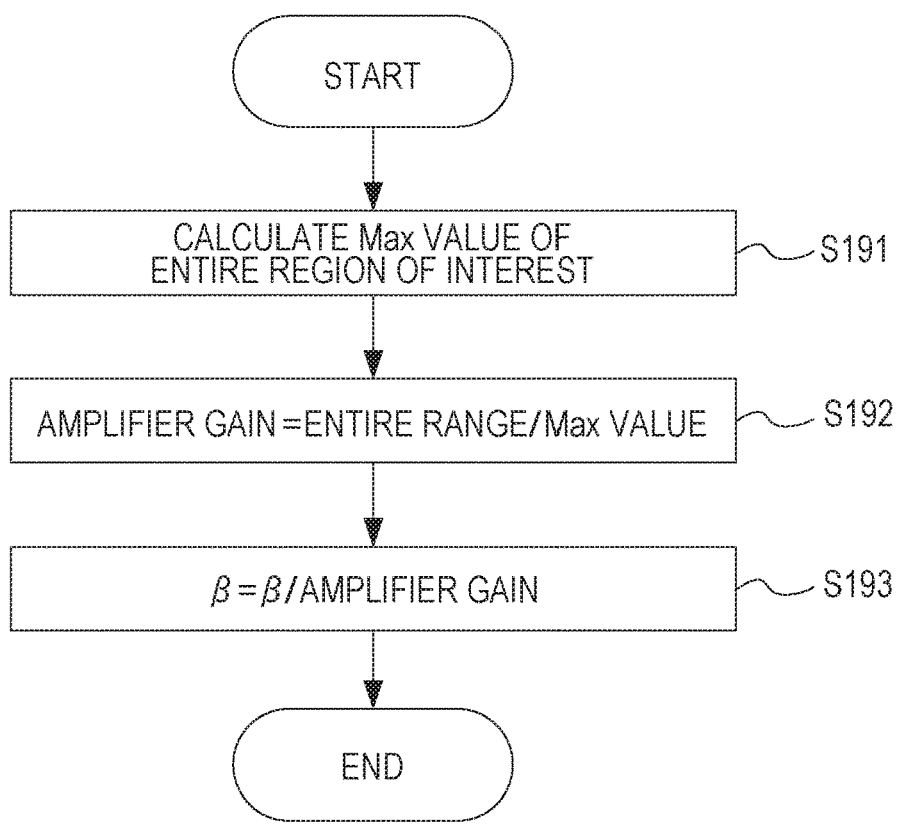
FIG. 9 is a flowchart illustrating a subroutine of image capturing parameter update processing.

FIG. 9 is a flowchart illustrating a subroutine of image capturing parameter update processing in step S190.

In step S191, the maximum value of the luminance value in all regions of interest is calculated. In step S192, the amplifier gain of the column amplifier circuit Amp included in the image sensor 101 is calculated. The amplifier gain is obtained by dividing the entire range that can be taken as a pixel signal by the maximum value of the luminance value calculated in step S191. In step S193, the extended value β calculated in step S184 is updated using the amplifier gain calculated in step S192. Specifically, the extended value β is updated with the value obtained by dividing the extended value β calculated in step S184 by the amplifier gain calculated in step S192. When step S193 is executed, the subroutine of FIG. 9 is terminated.

When step S190 is executed, the processing returns to step S130. In step S130, changed image capturing parameters in the image capturing parameters updated in step S190 are reflected. In this case, the amplifier gain set in step S192 is applied to the column amplifier circuit Amp. Further, the main image capturing flag is inverted and indicates true (a state of main image capturing). Next, the processing proceeds to step S140.

In step S140, as described above, the sensor control unit 102 performs accumulation and readout processing based on the region of interest and image capturing setting made in step S130. After completion of the processing of step S140, the processing proceeds to step S150.

In step S150, the sensor control unit 102 determines the main image capturing flag. In step S130, the main image capturing flag indicates true, and thus in this case, the processing proceeds to step S160.

In step S160, the contrast processing unit 106 performs contrast emphasis processing on the region of interest A to the region of interest D with respect to the image capturing signal data on the regions of interest A to D that is read in step S140 and has passed through the ADC 103 and the timing signal combining unit 105.

Figure 10:
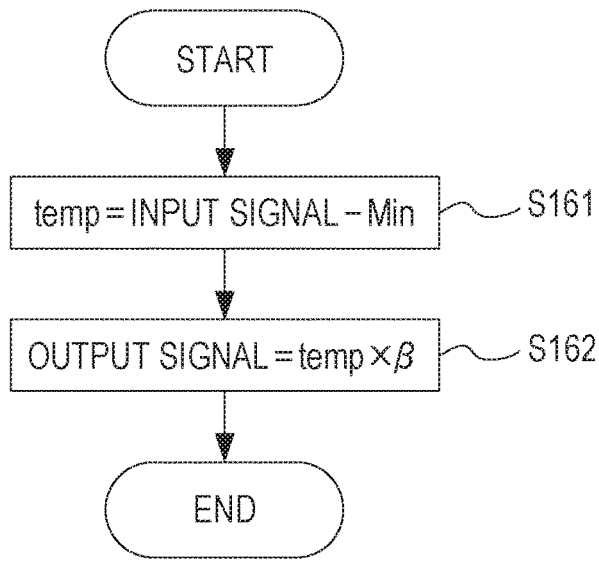
FIG. 10 is a flowchart illustrating a subroutine of contrast emphasis processing.

FIG. 10 is a flowchart illustrating a subroutine of the contrast emphasis processing of step S160. The subroutine illustrated in FIG. 10 is processed for each region of interest.

In step S161, the minimum luminance value of the region of interest is subtracted from the image capturing signal of each pixel by using the minimum luminance value of the region of interest calculated in step S180, and the subtraction result is stored as the variable temp. In step S162, an output signal is obtained by multiplying the variable temp calculated in step S161 by the extended value β calculated in step S193. The calculation in step S160 is applied to each pixel in the region of interest. When step S162 is executed, the subroutine of FIG. 10 is terminated, and then the processing proceeds to step S170.

Referring again to FIG. 6, in step S170, the image signal output unit 111 outputs the image capturing signal data of the region of interest A to the region of interest D subjected to contrast emphasis processing by the contrast processing unit 106 to the outside of the image capturing apparatus 100.

Figure 11:
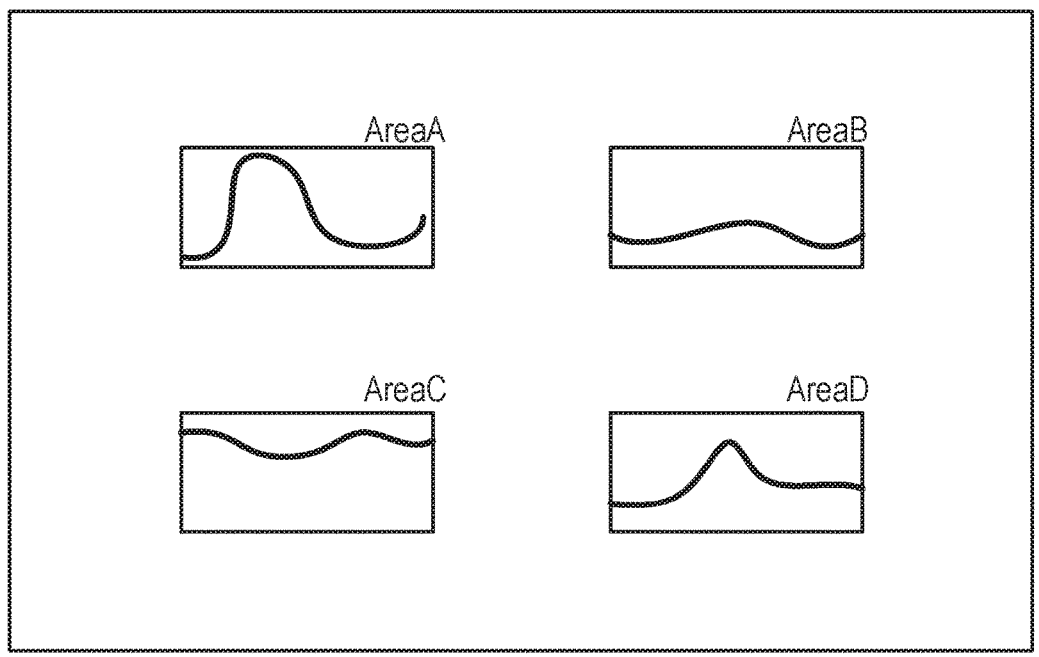
FIG. 11 is a diagram illustrating an example of a region of interest before contrast emphasis processing.

Hereinafter, the region of interest A to the region of interest D illustrated in FIG. 11 will be described as an example. FIG. 11 illustrates image capturing signals of the region of interest A to the region of interest D read in step S140 in a case where the main image capturing flag indicates false (a state where main image capturing is not carried out), and a characteristic line depicted in each region of interest represents a luminance value of an image capturing signal. In the region of interest A, image capturing signals over substantially the entire range are obtained. In the region of interest B, image capturing signals with low luminance and low contrast are obtained. In the region of interest C, image capturing signals with high luminance and low contrast are obtained. In the region of interest D, image capturing signals having a contrast of about an intermediate level between the regions of interest B and the region of interest C are obtained.

Figures 12A, 12B, 12C:
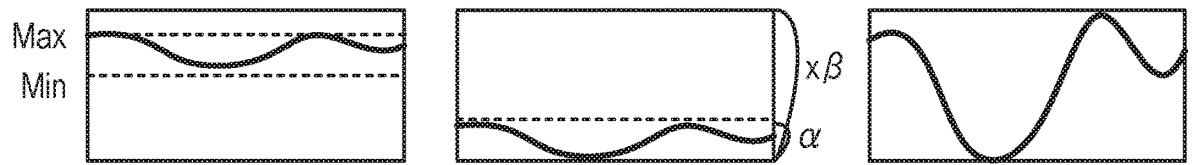
FIGS. 12A to 12C are graphs each illustrating an outline of contrast emphasis processing.

The contrast detection executed in step S180 on, for example, the region of interest C illustrated in FIG. 11 will be described with reference to FIGS. 12A to 12C. FIG. 12A is a graph illustrating the region of interest C. FIG. 12B is a graph illustrating an offset state by subtracting the minimum luminance value of the region of interest C from the image capturing signal of the region of interest C. FIG. 12C is a graph illustrating the region of interest C subjected to contrast emphasis processing.

The minimum luminance value of the region of interest C held in step S181 is indicated by Min in FIG. 12A. The maximum luminance value of the region of interest C held in step S182 is indicated by Max in FIG. 12A. The difference between Max and Min is the luminance range $\alpha$ of the region of interest, and corresponds to the range indicated by $\alpha$ in FIG. 12B.

Further, the extended value $\beta$ calculated in step S184 is a value obtained by dividing the entire range that can be taken as a pixel signal by the luminance range $\alpha$, in other words, $\alpha\,\beta$ is the entire range that can be taken as a pixel signal as illustrated in FIG. 12B.

FIG. 12C illustrates a state where the luminance range $\alpha$ is extended in the region of interest C by using the extended value $\beta$, and the state is equivalent to a combination of the amplifier gain calculated in step S192 and the extended value $\beta$ updated in step S193. In the contrast processing unit 106, the image capturing signal of the region of interest C is converted into an image capturing signal whose contrast is emphasized as illustrated in FIG. 12C.

Figure 13:
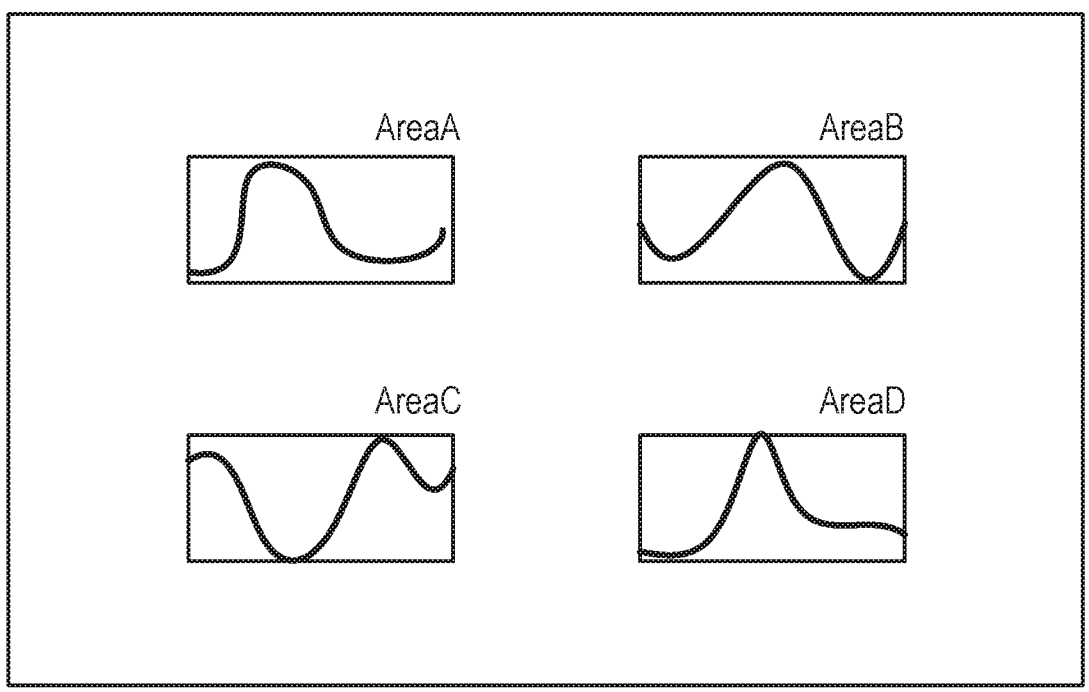
FIG. 13 is a view illustrating an example of a region of interest after contrast emphasis processing.

FIG. 13 illustrates image capturing signals of the region of interest A to the region of interest D subjected to contrast emphasis processing.

As described above, based on the setting value for the region of interest input by the region-of-interest input unit 107, the accumulation and readout processing for the image sensor 101 is controlled to read the image capturing signal of the region of interest. By preliminary image capturing prior to main image capturing, the contrast processing unit 106 detects the contrast of each region of interest, and obtains parameters for optimizing the contrast of each region of interest are obtained. After that, by main image capturing, the contrast processing unit 106 performs contrast emphasis processing on each region of interest, and outputs an image capturing signal with an emphasized contrast. In this case, even if there is a plurality of regions of interest, it is possible to obtain parameters for optimizing the contrast of each region of interest with one preliminary image capturing. Consequently, it is possible to obtain an image having an appropriate contrast of the region of interest while preventing an increase in processing time.

In the present exemplary embodiment, the image capturing signals of the region of interest A to the region of interest D are read in main image capturing, but the disclosure is not limited thereto. For example, in the main image capturing, the image capturing signal of a wide region including all or a part of the region of interest A to the region of interest D may be read and contrast emphasis processing may be performed in each region of interest in the wide region.

Second Exemplary Embodiment

In the first exemplary embodiment, the only amplifier gain is calculated based on the maximum value of the luminance value in all regions of interest in step S190.

In this case, when the gain is applied by the amplifier gain of the column amplifier circuit Amp, instead of the contrast emphasis processing by the extended value $\beta$, a high quality image may be obtained.

Accordingly, the present exemplary embodiment illustrates an example where the contrast emphasis processing is applied by changing the amplifier gain and reading the image capturing signal when the region of interest is separated by a certain distance or more in the vertical direction.

The configuration of the image capturing apparatus and the basic processing operation thereof are the same as those in the first exemplary embodiment, and thus the differences between the second exemplary embodiment and the first exemplary embodiment will be mainly described below.

Figure 14:
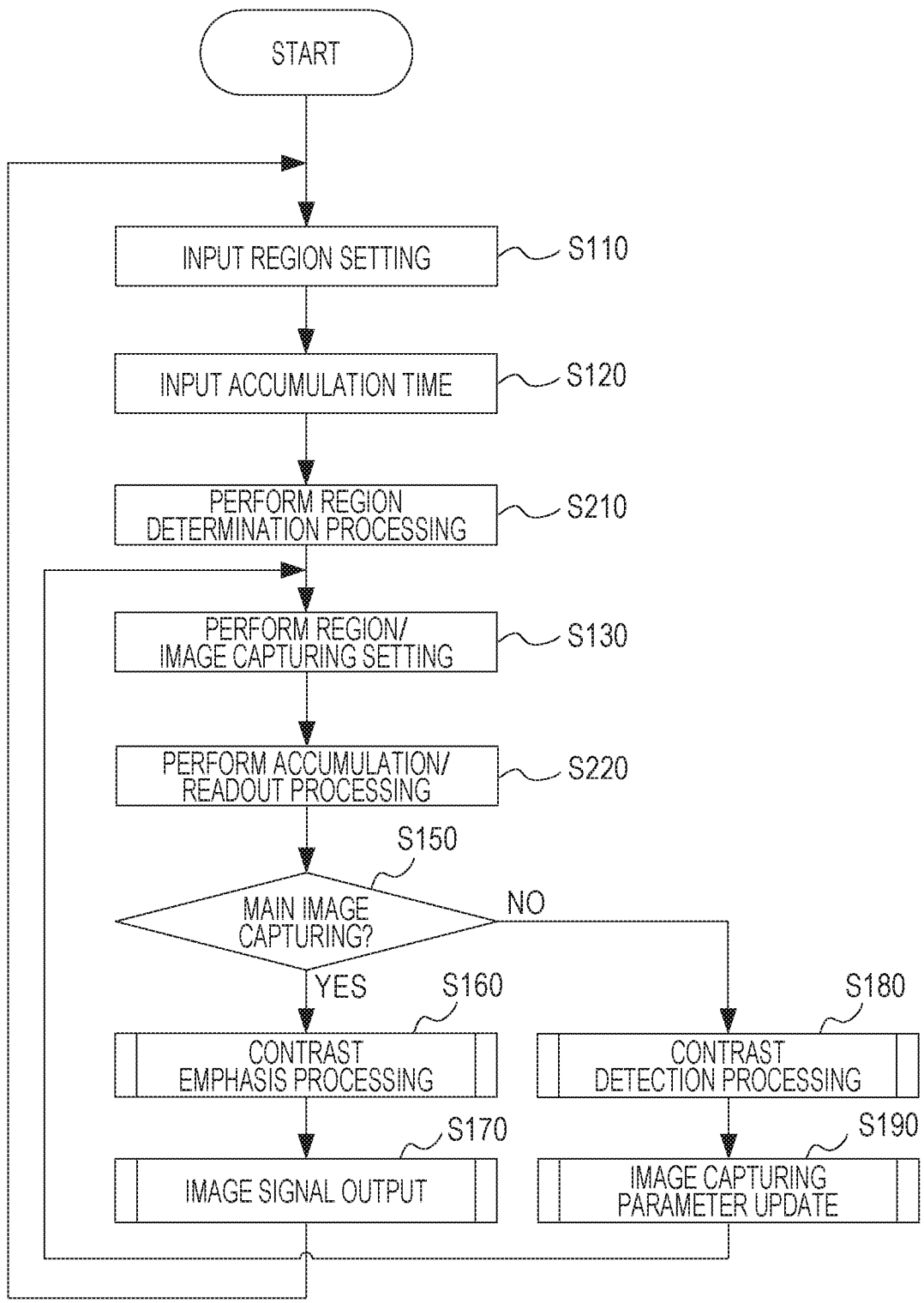
FIG. 14 is a flowchart illustrating processing performed by an image capturing apparatus according to a second exemplary embodiment.

FIG. 14 is a flowchart illustrating processing performed by the image capturing apparatus 100 in the second exemplary embodiment.

Steps S110 and S120 are the same as those in the first exemplary embodiment, and the setting value for the region of interest and the setting value for the accumulation time are input, and then the processing proceeds to step S210.

In step S210, the sensor control unit 102 performs region determination processing. In the regions of interest A to D illustrated in FIG. 5, there are 1,300 rows from the end rows of the region of interest A and the region of interest B to the start row of the region of interest C and the region of interest D. As illustrated in FIG. 7, if the skip time between regions of interest located at different positions in the vertical direction is equal to or longer than a predetermined time, a processing time for changing the amplifier gain can be secured. The predetermined time may be determined based on previously measured values or the like. As for the skip time, the skip time per row may be measured in advance and the measured skip time is multiplied by the number of rows between the regions of interest to calculate the skip time. If the skip time is equal to or longer than the predetermined time, an amplifier gain changeover valid flag is set to be true, and if the skip time is less than the predetermined time, the amplifier gain changeover valid flag is set to false. After completion of the process of step S210, the processing passes through step S130 and then proceeds to step S220.

Step S220 is substituted for step S140 of the first exemplary embodiment, and the sensor control unit 102 performs the accumulation and readout processing for the image sensor 101 on the basis of the region of interest and the image capturing setting made in the step S130.

Figure 15:
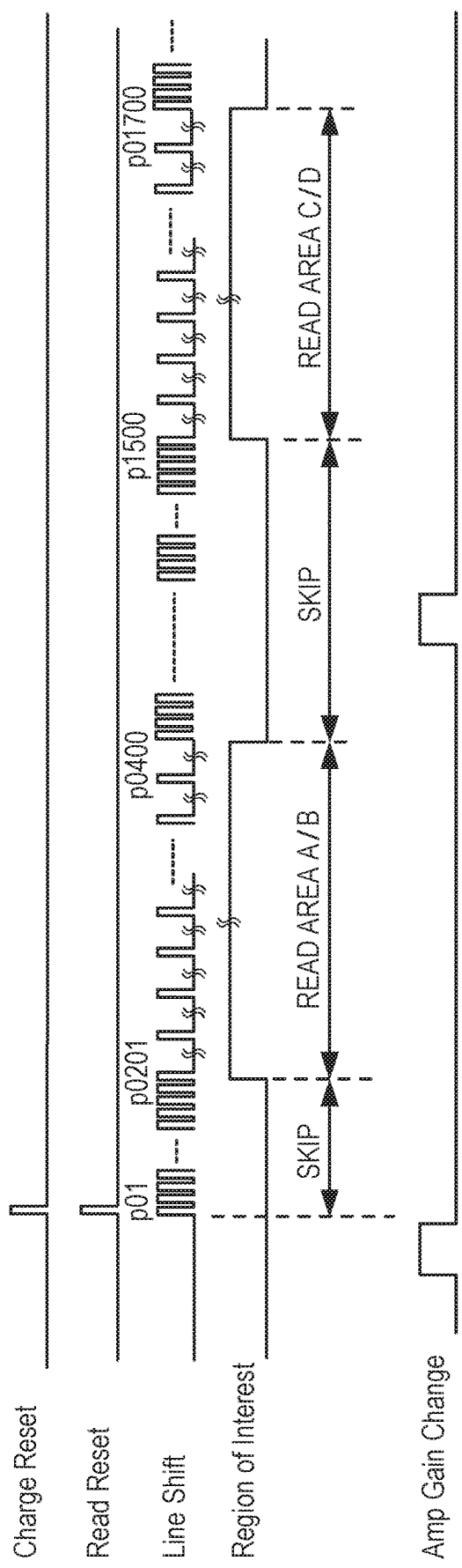
FIG. 15 is a timing chart of accumulation and readout processing.

FIG. 15 illustrates a timing chart of accumulation and readout processing executed in step S220. FIG. 15 illustrates the timing chart of FIG. 7 of the first exemplary embodiment in which Amp Gain Change representing the section in which the amplifier gain is changed as High is added. If the above-described amplifier gain changeover valid flag is true, that is, if the skip time between the regions of interest is equal to or longer than a predetermined time, the sensor control unit 102, in a skip section between the section Read Area A/B and the section Read Area C/D, changes the amplifier gain.

Steps S150 to S190 are the same as those in the first exemplary embodiment, and the descriptions thereof are omitted here.

As described above, in the second exemplary embodiment, the amplifier gain is detected based on the contrast of the region of interest and the amplifier gain is dynamically changed at the time of reading from the image sensor 101, thereby making it possible to obtain an image with a higher quality.

While the exemplary embodiments have been described above, the above-described embodiments are merely examples of implementation of the disclosure, and the technical scope of the disclosure should not be limitedly interpreted by the exemplary embodiments. That is, the disclosure can be implemented in various forms without departing from the technical idea or the main features thereof.

Although the exemplary embodiments illustrate an example where the four regions of interest A to D, the disclosure can be applied without limiting the number, the position, and the size of the regions of interest. In addition, although 3000 rows and 2000 rows of image capturing elements are illustrated by way of example, the disclosure is not limited thereto.

Other Exemplary Embodiments

The disclosure can also be implemented by processing in which a program that implements one or more functions of the exemplary embodiments described above is supplied to a system or apparatus via a network or a storage medium and one or more processors in a computer of the system or apparatus read and execute the program. The aspect of the embodiments can also be implemented by a circuit (e.g., an application specific integrated circuit (ASIC)) that implements one or more functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-200575, filed Oct. 16, 2017, which is hereby incorporated by reference herein in its entirety.

What is claimed is:

1. An apparatus capable of reading a pixel signal in a partial region from an image sensor comprising:
    at least one processor or circuit configured to function as:
    an input unit configured to input a setting value for a region of interest;
    a control unit configured to control accumulation and readout processing for the image sensor based on the setting value;
    a detection unit configured to detect a minimum luminance value and a maximum luminance value of the region of interest based on an image capturing signal obtained by a pixel signal read under control of the control unit; and
    a processing unit configured to perform contrast emphasis processing on the region of interest such that a luminance range based on a difference between the maximum luminance value and the minimum luminance value is assigned to an entire range possible to be taken as pixel signals.

2. The apparatus according to claim 1, wherein
    the detection is performed based on an image capturing signal obtained by a first image capturing, and
    the contrast emphasis processing is performed on an image capturing signal obtained by a second image capturing different from the first image capturing.

3. The apparatus according to claim 2, wherein the control unit controls reading of image capturing signals in a wide region including all or a part of the region of interest in the second image capturing.

4. The apparatus according to claim 1, wherein the detection unit calculates a luminance range by subtracting the minimum luminance value from the maximum luminance value, and calculates an extended value by dividing the entire range.

5. The apparatus according to claim 4, wherein the processing unit performs the contrast emphasis processing by subtracting the minimum luminance value in the region of interest from the image capturing signal in the region of interest and multiplying a subtraction result by a value corresponding to the extended value.

6. The apparatus according to claim 1, wherein
    the image sensor includes a plurality of amplifiers provided so as to respectively correspond to pixel columns, and
    the at least one processor or circuit further functions as an amplifier gain varying unit configured to change, when a plurality of the regions of interest is present, an amplifier gain between the regions of interest located at different positions in a vertical direction among the plurality of regions of interest.

7. A method for controlling an apparatus capable of reading a pixel signal in a partial region from an image sensor, the method comprising:
    inputting a setting value for a region of interest;

controlling accumulation and readout processing for the image sensor based on the setting value;

detecting a minimum luminance value and a maximum luminance value of the region of interest based on an image capturing signal by a pixel signal read from the image sensor; and performing contrast emphasis processing on the region of interest such that a luminance range based on a difference between the maximum luminance value and the minimum luminance value is assigned to an entire range possible to be taken as pixel signals.

8. The method according to claim 7, wherein the detecting is performed based on an image capturing signal obtained by a first image capturing, and the contrast emphasis processing is performed on an image capturing signal obtained by a second image capturing different from the first image capturing.

9. The method according to claim 8, wherein the controlling controls reading of image capturing signals in a wide region including all or a part of the region of interest in the second image capturing.

10. The method according to claim 7, wherein the detecting calculates a luminance range by subtracting the minimum luminance value from the maximum luminance value, and calculates an extended value by dividing the entire range.

11. The method according to claim 7, further comprising changing, when a plurality of the regions of interest is present, an amplifier gain between the regions of interest located at different positions in a vertical direction among the plurality of regions of interest, wherein the image sensor includes a plurality of amplifiers provided so as to respectively correspond to pixel columns.

12. A non-transitory computer-readable storage medium storing a program for controlling an apparatus capable of reading a pixel signal in a partial region from an image sensor, and causing a computer to perform a method comprising:

inputting a setting value for a region of interest;

controlling accumulation and readout processing for the image sensor based on the setting value input in the inputting the setting value for the region of interest;

detecting a minimum luminance value and a maximum luminance value of the region of interest based on an image capturing signal obtained by a pixel signal read in the controlling accumulation and readout processing; and performing contrast emphasis processing on the region of interest such that a luminance range based on a difference between the maximum luminance value and the minimum luminance value is assigned to an entire range possible to be taken as pixel signals.

13. The non-transitory computer-readable storage medium according to claim 12, wherein the detecting is performed based on an image capturing signal obtained by a first image capturing, and the contrast emphasis processing is performed on an image capturing signal obtained by a second image capturing different from the first image capturing.

14. The non-transitory computer-readable storage medium according to claim 13, wherein the controlling controls reading of image capturing signals in a wide region including all or a part of the region of interest in the second image capturing.

15. The non-transitory computer-readable storage medium according to claim 12, wherein the detecting calculates a luminance range by subtracting the minimum luminance value from the maximum luminance value, and calculates an extended value by dividing the entire range.

16. The non-transitory computer-readable storage medium according to claim 12, further comprising changing, when a plurality of the regions of interest is present, an amplifier gain between the regions of interest located at different positions in a vertical direction among the plurality of regions of interest, wherein the image sensor includes a plurality of amplifiers provided so as to respectively correspond to pixel columns.

\* \* \* \* \*